United States Patent
Terzuolo et al.

(10) Patent No.: US 9,981,831 B2
(45) Date of Patent: May 29, 2018

(54) DEVICE FOR HANDLING ARTIFACTS

(71) Applicant: INDUSTRIE COMETTO S.P.A., Borgo San Dalmazzo (CN) (IT)

(72) Inventors: Pierluigi Terzuolo, Borgo San Dalmazzo (IT); Fabrizio Lippi, Roccasparvera (IT)

(73) Assignee: INDUSTRIE COMETTO S.P.A., Borgo San Dalmazzo (CN) (IT)

( * ) Notice: Subject to any disclaimer, the term of this patent is extended or adjusted under 35 U.S.C. 154(b) by 0 days. days.

(21) Appl. No.: 15/433,937

(22) Filed: Feb. 15, 2017

(65) Prior Publication Data
US 2017/0233227 A1 Aug. 17, 2017

(30) Foreign Application Priority Data
Feb. 15, 2016 (IT) .......................... 102016000015371

(51) Int. Cl.
*B66C 3/14* (2006.01)
*B23Q 3/06* (2006.01)
*B23Q 7/04* (2006.01)
*B65G 47/90* (2006.01)

(52) U.S. Cl.
CPC ................ *B66C 3/14* (2013.01); *B23Q 3/064* (2013.01); *B23Q 7/04* (2013.01); *B65G 47/90* (2013.01); *B65G 47/905* (2013.01)

(58) Field of Classification Search
CPC .................................. B66C 3/14; B23Q 3/064
USPC .............. 294/201, 192, 113, 116, 907, 86.4; 414/24.5, 406, 407; 901/31
See application file for complete search history.

(56) References Cited

U.S. PATENT DOCUMENTS

| | | | | |
|---|---|---|---|---|
| 3,436,071 A | * | 4/1969 | Petruccelli | B23Q 3/16 269/20 |
| 3,540,501 A | * | 11/1970 | Jonsson | A01G 23/089 144/34.5 |
| 4,210,183 A | * | 7/1980 | Nilsen | A01G 23/089 144/34.1 |

(Continued)

FOREIGN PATENT DOCUMENTS

| | | |
|---|---|---|
| DE | 2654445 B1 | 3/1978 |
| GB | 2335180 A | 9/1999 |

OTHER PUBLICATIONS

Italian Patent Office Search Report and Written Opinion dated Oct. 20, 2016 (partially in English).

*Primary Examiner* — Paul T Chin
(74) *Attorney, Agent, or Firm* — Hedman & Costigan, P.C.

(57) ABSTRACT

A device for handling an artifact of substantially cylindrical shape, having a bed (10) and supporting means fixed to the bed (10) and connected to actuators. The supporting means being positioned along at least an arc of circumference lying in a plane orthogonal to the development axis α of the bed (10) and having rolling elements (3) adapted to support and handle an artifact, at least one of them being motorized. Each rolling element (3) is connected to one of a plurality of corresponding actuators operatively connected to each other and adapted to regulate a movement of the rolling elements (3) in response to forces exerted by the artifact on each rolling element (3), in such a way as to distribute the forces uniformly on each rolling element (3) to position one or more resultants of the forces in one or more points.

7 Claims, 4 Drawing Sheets

(56) References Cited

U.S. PATENT DOCUMENTS

| | | | | |
|---|---|---|---|---|
| 4,519,279 A * | 5/1985 | Ruggeri | ............... | B23Q 1/76 |
| | | | | 294/116 |
| 4,546,681 A * | 10/1985 | Owsen | ............... | B23Q 1/76 |
| | | | | 294/116 |
| 4,715,638 A * | 12/1987 | Chambers | ............... | B25J 9/14 |
| | | | | 294/106 |
| 5,378,033 A * | 1/1995 | Guo | ............... | A61F 2/583 |
| | | | | 294/115 |
| 6,598,917 B1 * | 7/2003 | Hapner | ............... | B25J 15/0028 |
| | | | | 157/1.36 |
| 7,036,396 B2 * | 5/2006 | Moe | ............... | E21B 19/168 |
| | | | | 294/194 |
| 8,733,810 B2 * | 5/2014 | Oda | ............... | B25J 15/083 |
| | | | | 294/86.4 |
| 8,807,613 B2 * | 8/2014 | Howell | ............... | B65F 3/04 |
| | | | | 294/106 |
| 9,682,452 B2 * | 6/2017 | Ueda | ............... | B23Q 1/763 |
| 2009/0107348 A1 | 4/2009 | Noonan | | |
| 2009/0297325 A1 | 12/2009 | Daraie | | |
| 2012/0003072 A1* | 1/2012 | Laurini | ............... | B25J 15/0028 |
| | | | | 414/746.7 |

* cited by examiner

DEVICE FOR HANDLING ARTIFACTS

TECHNICAL FIELD

The present invention relates to the field of devices for handling artifacts.

The present invention particularly relates to devices for handling artifacts according to the preamble of claim 1.

PRIOR ART

The handling of artifacts, and particularly large artifacts, is a common problem in the industry sector.

Generally, in industrial applications, such artifacts are handled by means of articulated mechanical arms or automatized robots, however this being a solution that employs complicated control techniques also as regards alignment of components to be assembled.

A solution to such problem provides structures, intended to receive the various components, which allow assembling both along an axis parallel to and an axis vertical to the ground plane.

An example are "cradle"-like structures that provide supporting means, such as for example sliding blocks, to support the load of the artifact. Such sliding blocks are equipped with air tubes that, by being inflated and deflated, allow the contact of the sliding blocks to fit the surface of the artifact and allow it to be held.

However such solutions have the drawback of providing supporting means that are not able to properly support the artifact since, due to their often quite large dimensions and weight, they are subjected, at the contact points, to surface pressures that can compromise their integrity.

A further drawback of such structures is the fact that they do not allow the artifact to rotate about its own development axis, and at the contact and support areas they distribute the load to be supported while generating statically indeterminate conditions, particularly when such structures have to support the load in the vertical position.

OBJECTS AND SUMMARY OF THE INVENTION

It is the object of the present invention to overcome prior art drawbacks.

Particularly it is the object of the present invention to provide a device for handling artifacts that reduces stresses harmful for the structural integrity of the load to be supported.

It is also the object of the present invention to provide a device for handling artifacts that allows a greater flexibility of use.

These and other objects of the present invention are achieved by a device for handling artifacts embodying the characteristics of the annexed claims, which are an integral part of the present description.

The idea at the base of the present invention provides to make a device for handling a substantially cylindrical shaped artifact, comprising a bed and supporting means fastened to the bed. The supporting means are connected to corresponding actuators and are placed along at least one arc of circumference lying on a plane orthogonal to the development axis of the bed, and comprising rolling elements intended to support and handle the artifact, at least one of which being motorized. Each rolling element is further connected to one of a plurality of corresponding actuators, operatively connected with each other, and intended to regulate a movement of the rolling elements in response to forces exerted by the artifact on each rolling element, such to uniformly distribute forces on each rolling element and such to place one or more resultants of said forces in one or more predetermined points.

Such solution allows stresses to be reduced which are harmful for the structural integrity of the load to be supported, since the use of rolling elements each one connected to actuators operatively connected with each other, allows reaction forces determined by surface pressures generated upon the contact between the supporting means and the artifact to be distributed in a controllable manner, therefore reducing the risk of generating cracks on its surface.

Such solution further allows the artifact to rotate about its own axis by the use of motorized rolling elements, thus integrating a type of handling that permit a higher flexibility of use of the device, thus not requiring providing further apparatuses dedicated to such type of operation.

Further advantageous characteristics of the present invention will be more clear from the following description and from the annexed claims, which are an integral part of the present invention.

BRIEF DESCRIPTION OF THE DRAWINGS

The invention will be described here below with reference to not limitative examples, provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION OF THE INVENTION

While the invention is susceptible of various modifications and alternative constructions, some not limitative embodiments, provided by way of example, are described in details herein below.

It should be understood, however, that there is no intention to limit the invention to the specific disclosed embodiments but, on the contrary, the invention intends to cover all the modifications, alternative constructions and equivalents that fall within the scope of the invention as defined in the claims.

In the description below, therefore, the use of "for example", "etc.", "or" denotes non-exclusive alternatives without limitation, unless otherwise noted; the use of "also" means "among which, but not limited to" unless otherwise noted; the use of "includes/comprises" means "includes/ comprises, but not limited to", unless otherwise noted.

In the present description the term "rolling element" means a mechanical member rotating about its own axis.

Figure 1:
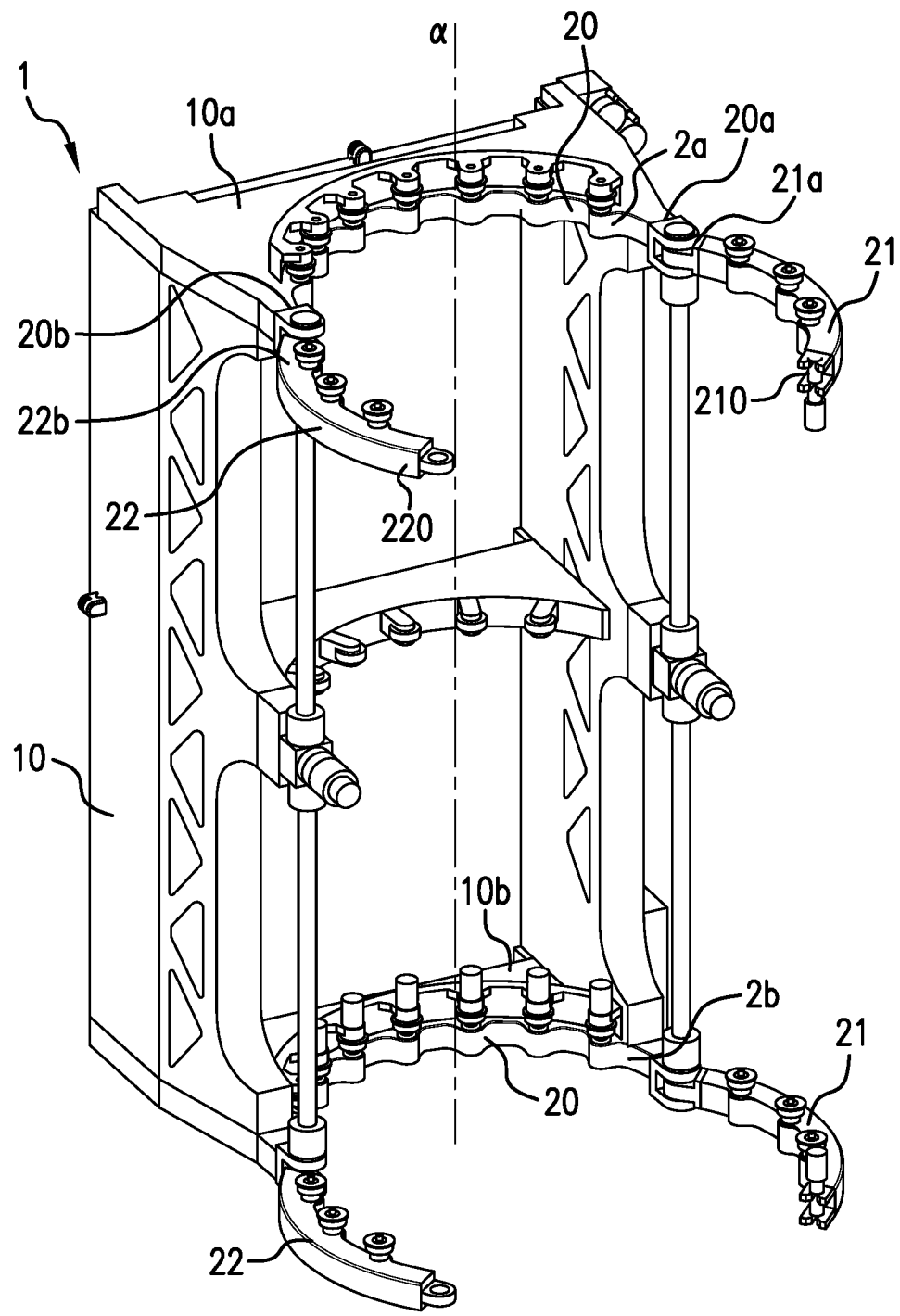
FIG. 1 is an assembly view of the device according to the invention.

FIG. 1 shows an axonometric assembly view of a device 1 for handling artifacts with a substantially cylindrical shape.

Figure 2:
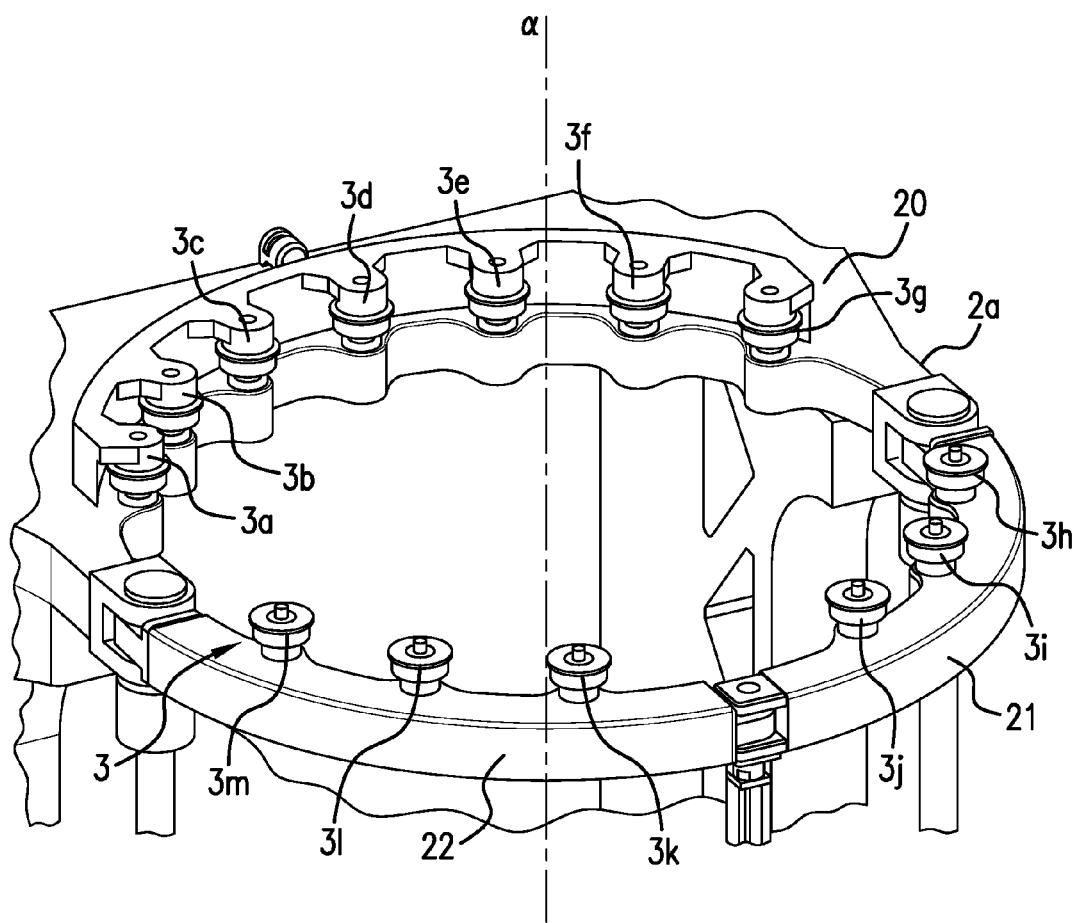
FIG. 2 is an axonometric view of a second enlarged detail of the device according to the invention.

In the shown embodiment, the artifact—not visible in FIGS. 1 and 2—is intended to be housed in a bed 10, which is a structure made with lateral walls defining a substantially rectangular shape, and it comprises on each one of the short walls (10a, 10b)—that is the ones lying on planes orthogonal to the development axis α of the bed—a ring (2a, 2b). The assembly of the two rings allows the artifact to be held in position when it is housed on the bed.

It is specified herein that a "rolling element" as defined above and as used in the present invention is a mechanical member that rotates about its own axis, such axis being parallel to the development axis α of the bed 10.

More in details, each ring (2a, 2b) comprises a first portion 20 and a second portion composed of a first 21 and a second 22 element, hinged together like jaws, such that the second portion is movable from an open position allowing the artifact to be housed, to a closed position where, together with the first portion 20, it forms the ring (2a, 2b) surrounding the artifact.

In a preferred embodiment and as visible in FIG. 1 and FIG. 2, the second portion of each ring (2a,2b) comprises a first 21 and a second 22 element, each one hinged by one end (21a, 22b) to a corresponding opposite terminal (20a,20b) of the first portion 20.

The first 21 and second 22 element are two arms equipped with coupling means at their free end (210, 220); in the closed position the coupling means allow the two arms to be mutually clamped and therefore allow the ring (2a,2b) to be formed with the first portion 20.

Although it is not visible in figures, the bed 10 further comprises movement means, such as for example hydraulic jacks or the like, that allow the device 1 to be lifted and rotated, that is to be arranged both in a position where the development axis α of the bed 10 is parallel to the ground plane, and in a position where such axis is orthogonal to the ground (such as shown in FIG. 1).

With reference to FIG. 2, supporting means are fixed on each ring (2a,2b) which are placed along its circumference and intended to support the artifact. Particularly the supporting means comprise rolling elements 3 that, in contact with the side surface of the artifact, allow it to rotate around its longitudinal axis.

FIG. 2 shows the ring 2a, that is the upper ring, namely the ring farthest from the ground plane when the device 1 is positioned vertically. In the shown embodiment, seven rolling elements 3 are shown at the first portion 20 of the ring 2a, and three rolling elements 3 are shown on each one of the two arms (21, 22) of the second portion of the ring 2a. Even if not shown in the figures, a similar arrangement of rolling elements 3 is provided on the ring 2b.

However in alternative embodiments the rolling elements 3 fixed on the ring 2a, and more generally on both the rings (2a,2b) can be in a different number.

Moreover at least one of such rolling elements 3 is motorized, such that its operation causes the artifact to rotate about its longitudinal axis and consequently it allows the remaining rolling elements 3 to start the rotation by being entrained.

Figure 3:
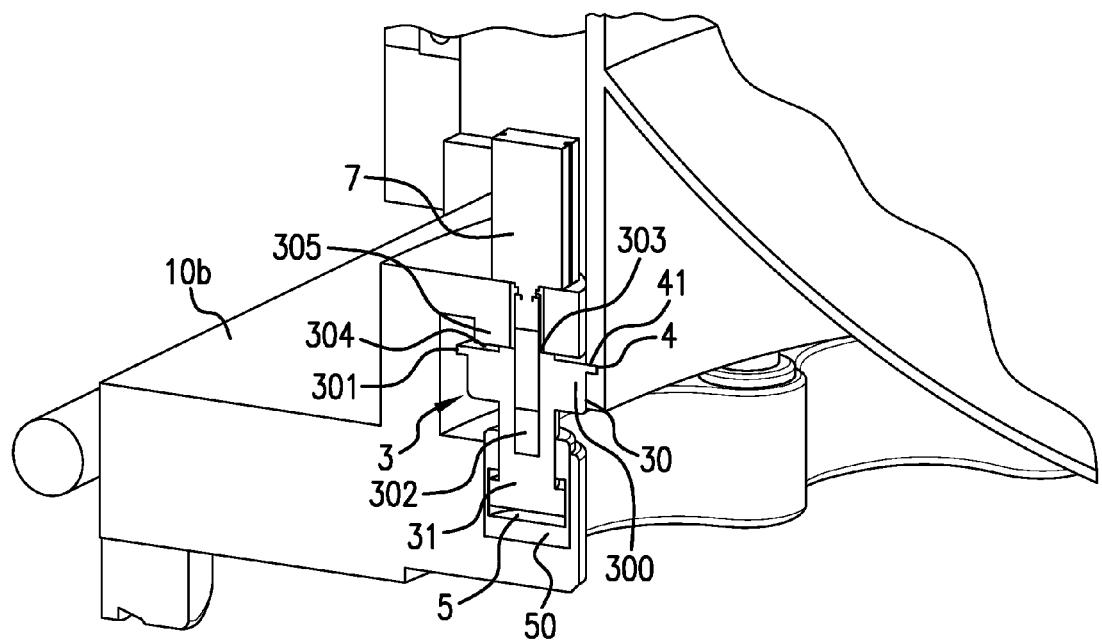
FIG. 3 is a section view of an enlarged detail of the device according to the invention.

The motorization of the rolling element 3 is obtained by means of mechanical members able to handle the movement and for example, with reference to FIG. 3, by providing a servomotor 7.

Each rolling element 3 is further connected to one of a plurality of actuators, operatively connected with each other, which allow a movement of the rolling elements 3 to be regulated depending on forces exerted by the artifact on each rolling element 3.

Actuators for example can be hydraulic, electric, electromagnetic, pneumatic or oleodynamic actuators, and the rolling elements are movable along a direction parallel to the development axis α of the bed 10.

In this manner and advantageously in the operating condition where the device 1 is placed orthogonally to the ground plane, each rolling element 3 allows the load exerted by the artifact on the device 10 to be distributed in a controllable manner.

In other words, the movement of the rolling elements 3 allows one or more of the resultants of the forces exerted upon the contact with the artifact to be positioned in one or more predetermined points.

To this end, the device 1 further comprises a control unit intended to control each actuator through a plurality of valves and to allow them to be grouped in different operating configurations.

For example with reference to FIG. 2, the control unit allows the actuators relating to a first group (3a, 3b, 3c, 3d, 3e, 3f, 3g) of rolling elements 3 fitted on the first portion 20 of the ring to be put in communication with each other, and the actuators relating to a second (3h, 3i, 3j) and a third (3k, 3l, 3m) group of rolling elements (3) fitted on the first (21) and second (22) element of the second portion of the ring respectively to be put in communication with each other.

In the same manner, the control unit can determine configurations grouping the actuators relating to the second ring and also it can allow groups of actuators relating to rolling elements 3 arranged on different rings to communicate.

FIG. 3 shows an enlarged section view of a rolling element 3 relating to the ring 2b. In such embodiment, each rolling element 3 is connected to an oleodynamic actuator and comprises a portion 30 outside the ring and a rod 31.

The outer portion 30 of the rolling element 3 comprises a substantially cylindrical central body 300 and whose axis develops along a direction parallel to the development axis α of the bed 10, and a circular relief 301 protrudes therefrom surrounding the side surface of the central body 300.

The central body 300 has a coaxial cavity 302 facing by an aperture 303 an upper surface 304 of the rolling element 3. Such cavity 302 allows the servomotor 7 to be mechanically connected, for example by means of splined profiles, with the rolling element 3 in order to drive a rotation thereof.

The upper surface 304 on the contrary allows the rolling element 3 to abut on a stop element 305 for its movement along the direction parallel to the development axis α of the bed 10.

The relief 301 is intended to engage a groove obtained on the outer surface of the artifact, and allows a side wall 41 of the groove 4 and the rolling body to be in contact when the device 1 is placed vertically with respect to the ground plane.

The rod 31 of the rolling element 3 on the contrary is housed inside a cylindrical chamber 5 containing pressurized fluid. In the embodiment shown in the figure, the chamber 5 is a chamber of a cylinder 50 fitted in the ring. However variant embodiments can provide the chamber 5 to be obtained on the ring itself.

Based on the operating configuration determined by the control unit, a different number of actuators is grouped and consequently the respective cylindrical chambers 5 of each group are put in fluid communication with each other by opening or closing the valves.

Thus the rod 31 of each rolling element 3 relating to the same group of actuators, by running inside the respective chamber, compensates for the forces generated by the contact of each rolling element 3 with the artifact, and it allows it to be supported by balancing the load on the supporting means.

Preferably and with the device 1 placed orthogonally to the ground plane, the control unit groups the actuators of the two rings (2a, 2b) in such a manner that the interconnection of the groups formed in this way occurs between groups of actuators relating to different rings. Thus the load exerted by the artifact is uniformly distributed on the supporting means arranged on the upper ring and lower ring, generating an isostatic supporting condition.

A possible operating configuration for example can provide the actuators relating to rolling elements 3 of the lower ring 2b to be grouped in three groups, allowing the load of the artifact to be balanced at the lower part in 3 points, while the actuators relating to rolling elements 3 of the upper ring 2a—that is the one closest to the ground plane—to be grouped in only one group, these latter therefore balancing at the upper part the load of the artifact only in one point.

Figure 4:
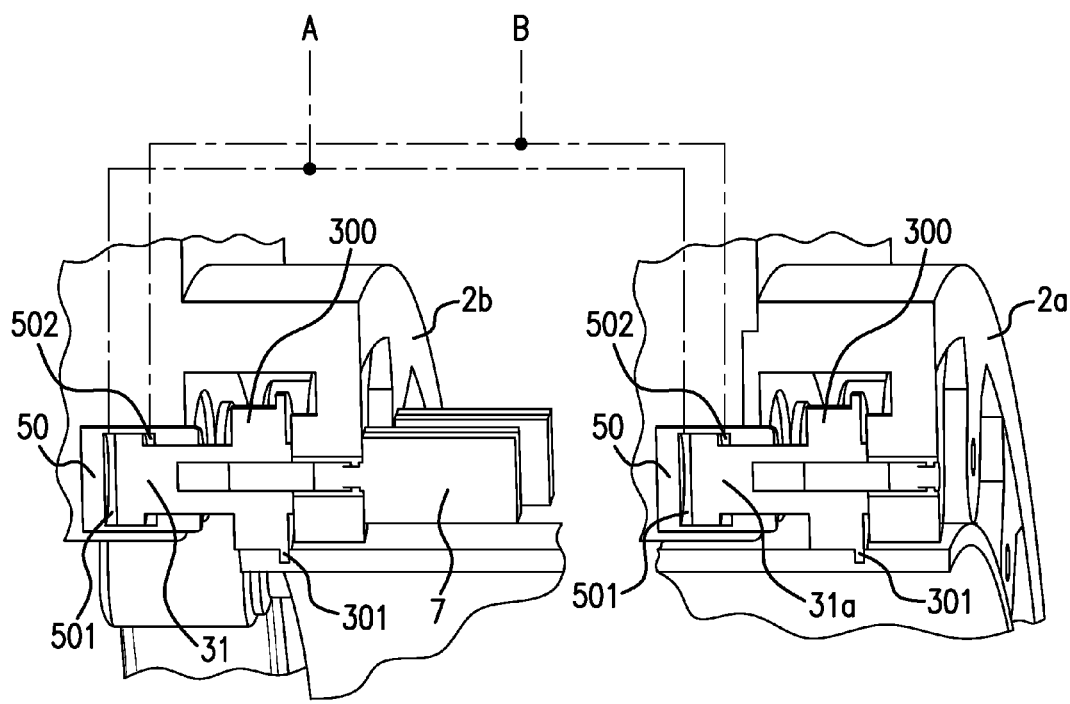
FIG. 4 is the scheme of an operating configuration of the device according to the invention.

Generally the hydraulic connection between actuators of different rings is accomplished according to the scheme shown in FIG. 4. The cylindrical chamber 5 where the rod 31 of each rolling element 3 runs, comprises a rear chamber 501 and an upper chamber 502, isolated from each other and each one containing a fluid at different pressures. The pressurized fluid acts in both the chambers, for example depending on the load perceived by the rolling element 3, and it allows the rod 31 to move along the axis of the cylinder 50 in both the directions.

Moreover a connection A allows for the fluid communication between the rear chambers 501 of cylinders arranged on different rings, and a connection B allows for a fluid communication among the respective upper chambers 502.

A stress due to the load of the artifact on the rolling elements 3 of different rings corresponds to a change of pressure in the chambers (501, 502) and a movement, proportional to such change, of each rod 31 inside them. Thus the load is balanced between the upper and lower rings, and therefore an isostatic supporting condition for the artifact is realized.

In one embodiment of the invention, the control unit allows the pressures inside the chambers (501,502) to be controlled and therefore the amount of movement of each rolling element 3 along the direction parallel to the development axis α to be regulated. Depending on such regulation, and by virtue of the hydraulic connection allowing the load to be uniformly distributed between respective supporting means, the device allows the artifact to be handled by keeping the latter in an isostatic supporting condition.

Advantageously the actuators allow also the position of the rolling element 3 to be adapted inside the groove when the device 1 is arranged with the development axis α parallel to the ground surface.

From the above description it is clear how the described device allows the provided objects to be reached.

It is therefore clear, for a person skilled in the art, that is possible to make changes and variants to the solution described with reference to the above figures without for this reason departing from the scope of protection of the present patent as defined in the annexed claims.

The invention claimed is:

1. Device (1) for handling an artifact of substantially cylindrical shape, comprising,
   a bed (10),
   supporting means fixed to said bed (10) and connected to actuators, said supporting means being positioned along at least an arc of circumference lying in a plane orthogonal to the development axis (α) of the bed (10), characterized in that
said supporting means comprise rolling elements (3) adapted to support and handle said artifact, at least one of said rolling elements (3) being motorized, and in that each rolling element (3) is connected to one of a plurality of actuators operatively connected to each other and adapted to regulate a movement of the rolling elements (3) in response to forces exerted by the artifact on each rolling element (3), in such a way as to distribute said forces uniformly on each rolling element (3) and to position one or more resultants of said forces in one or more predetermined points wherein said rolling elements (3) are arranged on at least one ring (2a, 2b) which juts from said bed (10), wherein said at least one ring (2a, 2b) comprises a first portion (20) and a second portion hinged to said first portion (20), wherein said second portion is movable between an open position to allow the artifact to be housed and a closed position in which it forms said ring (2a, 2b) with the first portion (20) and wherein said second portion comprises a first (21) and a second (22) element, each one having a first and a second end, each one hinged by its first end to a corresponding terminal of said first portion (20) and each one provided, at its second end, with coupling means configured in such a way that, in said closed position, said first portion (20) and said first (21) and second (22) element form said ring (2a, 2b).

2. Device (1) according to claim 1, wherein said rolling elements (3) are movable along a direction parallel to said development axis (α) of the bed (10).

3. Device (1) according to claim 1, further comprising a control unit adapted to control each of said plurality of actuators and to group them in different operating configurations.

4. Device (1) according to claim 3, wherein in at least one of said different operating configurations said rolling elements (3) allow the artifact to be supported in isostatic conditions.

5. Device (1) according to claim 1, wherein said actuators are hydraulic actuators or electrical actuators or electromagnetic actuators or pneumatic actuators or oleodynamic actuators.

6. Device (1) according to claim 1, further comprising moving means adapted to allow the device to rotate between a first position in which said development axis α of the bed is parallel to the ground plane and a second position in which said development axis α of the bed is orthogonal to the ground plane.

7. Device (1) according to claim 1, wherein said rolling elements (3) comprise a substantially cylindrical central body (300) from which a circular relief (301) protrudes that surrounds the lateral surface of said central body (300), wherein said relief is intended to engage a groove formed on the outer surface of said artifact.

* * * * *